US009354939B2

(12) United States Patent
Ferris et al.

(10) Patent No.: US 9,354,939 B2
(45) Date of Patent: May 31, 2016

(54) GENERATING CUSTOMIZED BUILD OPTIONS FOR CLOUD DEPLOYMENT MATCHING USAGE PROFILE AGAINST CLOUD INFRASTRUCTURE OPTIONS

(75) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 878 days.

(21) Appl. No.: 12/789,701

(22) Filed: May 28, 2010

(65) Prior Publication Data

US 2011/0295986 A1  Dec. 1, 2011

(51) Int. Cl.
*G06F 15/177* (2006.01)
*G06F 9/50* (2006.01)
*G06F 9/48* (2006.01)

(52) U.S. Cl.
CPC .............. *G06F 9/5072* (2013.01); *G06F 9/50* (2013.01); *G06F 9/4856* (2013.01)

(58) Field of Classification Search
CPC ........ G06F 9/50; G06F 9/5027; G06F 9/4856
USPC ............................................. 709/222; 718/1
See application file for complete search history.

(56) References Cited

U.S. PATENT DOCUMENTS

| 6,463,457 | B1 | 10/2002 | Armentrout et al. |
| 7,240,239 | B2 * | 7/2007 | Suzaki ............................. 714/15 |
| 7,313,796 | B2 | 12/2007 | Hamilton et al. |
| 7,439,937 | B2 | 10/2008 | Ben-Shachar et al. |
| 7,529,785 | B1 | 5/2009 | Spertus et al. |
| 7,546,462 | B2 | 6/2009 | Upton |
| 7,596,620 | B1 | 9/2009 | Colton et al. |
| 8,316,125 | B2 * | 11/2012 | DeHaan ......................... 709/224 |
| 8,359,217 | B2 * | 1/2013 | Brodie et al. ................. 705/7.11 |
| 8,909,784 | B2 * | 12/2014 | Ferris .................. H04W 4/0003 709/212 |
| 9,037,692 | B2 * | 5/2015 | Ferris .................... G09F 9/5072 709/220 |
| 2001/0039497 | A1 | 11/2001 | Hubbard |
| 2002/0069276 | A1 | 6/2002 | Hino et al. |
| 2002/0165819 | A1 | 11/2002 | McKnight et al. |
| 2003/0037258 | A1 | 2/2003 | Koren |
| 2003/0069944 | A1 * | 4/2003 | Barlock et al. ................ 709/220 |
| 2003/0110252 | A1 | 6/2003 | Yang-Huffman |
| 2003/0135609 | A1 | 7/2003 | Carlson et al. |
| 2004/0162902 | A1 | 8/2004 | Davis |
| 2004/0210591 | A1 | 10/2004 | Hirschfeld et al. |
| 2004/0210627 | A1 | 10/2004 | Kroening |
| 2004/0268347 | A1 * | 12/2004 | Knauerhase et al. ............. 718/1 |
| 2005/0131898 | A1 | 6/2005 | Fatula |
| 2005/0144060 | A1 | 6/2005 | Chen et al. |
| 2005/0177628 | A1 * | 8/2005 | Victoria et al. ............... 709/220 |

(Continued)

OTHER PUBLICATIONS

Morgan, "Systems and Methods for Detecting Resource Consumption Events Over Sliding Intervals in Cloud-Based Network", U.S. Appl. No. 13/149,235, filed May 31, 2011.

(Continued)

*Primary Examiner* — Joseph E Avellino
*Assistant Examiner* — James Conaway
(74) *Attorney, Agent, or Firm* — Lowenstein Sandler LLP

(57) ABSTRACT

A decision system for providing customized application build options to users of a cloud computing environment. The decision system can receive user usage history data and determine a customized set of application resources based on the usage history data. Information about the customized set of application resources can then be supplied to the user.

15 Claims, 7 Drawing Sheets

(56) References Cited

U.S. PATENT DOCUMENTS

| | | |
|---|---|---|
| 2005/0182727 A1 | 8/2005 | Robert et al. |
| 2005/0204198 A1* | 9/2005 | Pagan .............................. 714/36 |
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0168174 A1* | 7/2006 | Gebhart et al. ............... 709/223 |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0040714 A1* | 2/2008 | Wheeler et al. ............... 717/174 |
| 2008/0080396 A1 | 4/2008 | Meijer et al. |
| 2008/0080526 A1* | 4/2008 | Gounares et al. ............. 370/401 |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228888 A1* | 9/2009 | Vengerov .............. G06F 9/5083 718/102 |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1 | 11/2009 | Nickolov et al. |
| 2009/0282404 A1* | 11/2009 | Khandekar et al. ............... 718/1 |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris |
| 2009/0300635 A1* | 12/2009 | Ferris ..................... G06Q 30/02 718/104 |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0075665 A1* | 3/2010 | Nader et al. ............... 455/426.1 |
| 2010/0082899 A1* | 4/2010 | Nakajima et al. ............. 711/114 |
| 2010/0125473 A1* | 5/2010 | Tung .................... G06F 9/5072 709/200 |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0220622 A1 | 9/2010 | Wei |
| 2010/0235355 A1* | 9/2010 | Carter et al. .................. 707/736 |
| 2010/0235835 A1* | 9/2010 | Nishiguchi et al. ............... 718/1 |
| 2010/0299366 A1 | 11/2010 | Stienhans et al. |
| 2010/0318609 A1* | 12/2010 | Lahiri et al. .................. 709/205 |
| 2010/0332262 A1* | 12/2010 | Horvitz et al. .................... 705/4 |
| 2010/0332657 A1* | 12/2010 | Elyashev et al. ............. 709/226 |
| 2011/0016214 A1 | 1/2011 | Jackson |
| 2011/0022812 A1* | 1/2011 | van der Linden et al. ..... 711/163 |
| 2011/0055377 A1* | 3/2011 | Dehaan ........................ 709/224 |
| 2011/0055396 A1* | 3/2011 | Dehaan ........................ 709/226 |
| 2011/0055399 A1* | 3/2011 | Tung .................... G06F 9/5072 709/226 |
| 2011/0093941 A1* | 4/2011 | Liu et al. .......................... 726/7 |
| 2011/0131335 A1 | 6/2011 | Spaltro et al. |
| 2011/0145392 A1* | 6/2011 | Dawson et al. ............... 709/224 |
| 2011/0270963 A1* | 11/2011 | Saito et al. .................... 709/224 |
| 2011/0277027 A1* | 11/2011 | Hayton et al. .................... 726/8 |
| 2011/0289329 A1* | 11/2011 | Bose et al. .................... 713/320 |
| 2011/0296025 A1* | 12/2011 | Lieblich et al. ............... 709/226 |
| 2013/0160007 A1* | 6/2013 | Cawlfield et al. ................. 718/1 |

OTHER PUBLICATIONS

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

Morgan, "Systems and Methods for Tracking Cloud installation Information Using Cloud-Aware Kernel of Operating system", U.S. Appl. No. 13/149,750, filed May 31, 2011.

Morgan, "Systems and Methods for Introspective Application Reporting to Facilitate Virtual Machine Movement Between Cloud Hosts", U.S. Appl. No. 13/118,009, filed May 27, 2011.

Morgan, "Systems and Methods for Self-Moving Operating System Installation in Cloud-Based Network", U.S. Appl. No. 13/149,877, filed May 31, 2011.

Morgan, "Systems and Methods for Generating Optimized Resource Consumption Periods for Multiple Users on Combined Basis", U.S. Appl. No. 13/037,359, filed Mar. 1, 2011.

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

"rBuilder and the rPath Appliance Platform", 2007 rPath, Inc., www.rpath.com, 3 pages.

White Paper—"rPath Versus Other Software Appliance Approaches", Mar. 2008, rPath, Inc., www.rpath.com, 9 pages.

White Paper—"Best Practices for Building Virtual Appliances", 2008 rPath, Inc., www.rpath.com, 6 pages.

DeHaan et al., "Methods and Systems for Flexible Cloud Management with Power Management Support", U.S. Appl. No. 12/473,987, filed May 28, 2009.

Ferris, "Methods and Systems for Providing a Market for User-Controlled Resources to be Provided to a Cloud Computing Environment", U.S. Appl. No. 12/390,617, filed Feb. 23, 2009.

Ferris, "Methods and Systems for Communicating with Third Party Resources in a Cloud Computing Environment", U.S. Appl. No. 12/390,598, filed Feb. 23, 2009.

Ferris, "Systems and Methods for Extending Security Platforms to Cloud-Based Networks", U.S. Appl. No. 12/391,802, filed Feb. 24, 2009.

DeHaan et al., "Methods and Systems for Flexible Cloud Management", U.S. Appl. No. 12/473,041, filed May 27, 2009.

(56) References Cited

OTHER PUBLICATIONS

DeHaan et al., "Systems and Methods for Power Management in Managed Network Having Hardware-Based and Virtual Reources", U.S. Appl. No. 12/475,448, filed May 29, 2009.

Ferris, "Methods and Systems for Providing a Universal Marketplace for Resources for Delivery to a Cloud Computing Environment", U.S. Appl. No. 12/475,228, filed May 29, 2009.

DeHaan, "Methods and Systems for Abstracting Cloud Management", U.S. Appl. No. 12/474,113, filed May 28, 2009.

DeHaan, "Methods and Systems for Automated Scaling of Cloud Computing Systems", U.S. Appl. No. 12/474,707, filed May 29, 2009.

DeHaan, "Methods and Systems for Securely Terminating Processes in a Cloud Computing Environment", U.S. Appl. No. 12/550,157, filed Aug. 28, 2009.

DeHaan et al., "Methods and Systems for Flexible Cloud Management including External Clouds", U.S. Appl. No. 12/551,506, filed Aug. 31, 2009.

DeHaan, "Methods and Systems for Abstracting Cloud Management to Allow Communication Between Independently Controlled Clouds", U.S. Appl. No. 12/551,096, filed Aug. 31, 2009.

DeHaan, "Methods and Systems for Automated Migration of Cloud Processes to External Clouds", U.S. Appl. No. 12/551,459, filed Aug. 31, 2009.

Ferris et al., "Methods and Systems for Pricing Software Infrastructure for a Cloud Computing Environment", U.S. Appl. No. 12/551,517, filed Aug. 31, 2009.

Ferris et al., "Methods and Systems for Metering Software Infrastructure in a Cloud Computing Environment", U.S. Appl. No. 12/551,514, filed Aug. 31, 2009.

DeHaan et al., "Systems and Methods for Secure Distributed Storage", U.S. Appl. No. 12/610,0131, filed Oct. 30, 2009.

Ferris et al., "Methods and Systems for Monitoring Cloud Computing Environments", U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

Ferris et al., "Methods and Systems for Verifying Software License Compliance in Cloud Computing Environments", U.S. Appl. No. 12/627,643, filed Nov. 30, 2009.

Ferris et al., "Systems and Methods for Service Aggregation Using Graduated Service Levels in a Cloud Network", U.S. Appl. No. 12/628,112, filed Nov. 30, 2009.

Ferris et al., "Methods and Systems for Generating a Software License Knowledge Base for Verifying Software License Compliance in Cloud Computing Environments", U.S. Appl. No. 12/623,156, filed Nov. 30, 2009.

Ferris et al., "Methods and Systems for Converting Standard Software Licenses for Use in Cloud Computing Environments", U.S. Appl. No. 12/714,099, filed Feb. 26, 2010.

Ferris et al., "Systems and Methods for Managing a Software Subscription in a Cloud Network", U.S. Appl. No. 12/714,096, filed Feb. 26, 2010.

Ferris et al., "Methods and Systems for Providing Deployment Architectures in Cloud Computing Environments", U.S. Appl. No. 12/714,427, filed Feb. 26, 2010.

Ferris et al., "Methods and Systems for Matching Resource Requests with Cloud Computing Environments", U.S. Appl. No. 12/714,113, filed Feb. 26, 2010.

Ferris et al., "Systems and Methods for Generating Cross-Cloud Computing Appliances", U.S. Appl. No. 12/714,315, filed Feb. 26, 2010.

Ferris et al., "Systems and Methods for Cloud-Based Brokerage Exchange of Software Entitlements", U.S. Appl. No. 12/714,302, filed Feb. 26, 2010.

Ferris et al., "Methods and Systems for Offering Additional License Terms During Conversion of Standard Software Licenses for Use in Cloud Computing Environments", U.S. Appl. No. 12/714,065, filed Feb. 26, 2010.

Ferris et al., "Systems and Methods for or a Usage Manager for Cross-Cloud Appliances", U.S. Appl. No. 12/714,334, filed Feb. 26, 2010.

Ferris et al., "Systems and Methods for Delivery of User-Controlled Resources in Cloud Environments Via a Resource Specification Language Wrapper", U.S. Appl. No. 12/790,294, filed May 28, 2010.

Ferris et al., "Systems and Methods for Managing Multi-Level Service Level Agreements in Cloud-Based Networks", U.S. Appl. No. 12/789,660, filed May 28, 2010.

Ferris et al., "Methods and Systems for Generating Cross-Mapping of Vendor Software in a Cloud Computing Environment", U.S. Appl. No. 12/790,527, filed May 28, 2010.

Ferris et al., "Methods and Systems for Cloud Deployment Analysis Featuring Relative Cloud Resource Importance", U.S. Appl. No. 12/790,366, filed May 28, 2010.

Ferris et al., "Systems and Methods for Exporting Usage History Data as Input to a Management Platform of a Target Cloud-Based Network", U.S. Appl. No. 12/790,415, filed May 28, 2010.

Ferris et al., "Systems and Methods for Cross-Vendor Mapping Service in Cloud Networks", U.S. Appl. No. 12/790,162, filed May 28, 2010.

Ferris et al., "Systems and Methods for Cross-Cloud Vendor Mapping Service in a Dynamic Cloud Marketplace", U.S. Appl. No. 12/790,229, filed May 28, 2010.

Ferris et al., "Systems and Methods for Aggregate Monitoring of Utilization Data for Vendor Products in Cloud Networks", U.S. Appl. No. 12/790,039, filed May 28, 2010.

Ferris, et al., "Systems and Methods for Cominatorial Optimization of Multiple Resources Across a Set of Cloud-Based Networks", U.S. Appl. No. 12/953,718, filed Nov. 24, 2010.

Ferris et al., "Systems and Methods for Matching a Usage History to a New Cloud", U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in a Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, filed Nov. 23, 2010.

Ferris et al., "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

* cited by examiner

| APPLICATION RESOURCE REPORT ||||
|---|---|---|---|
| COMPANY ID: CORPORATION A 405 | START DATE: MAY 15, 2010 410 | START TIME: 00:00 415 | CLOUD ID: CLOUD A 420 |
| PARAMETERS | |||
| APPLICATIONS: 425 | MESSAGING - MICROSOFT EXCHANGE DATABASE MANAGEMENT - ORACLE ENTERPRISE |||
| TOTAL DURATION: 460 | 24 HOURS |||
| PERIODS OF DURATION: 470 | 1 HOUR |||
| MONITORED USAGE HISTORY 475 ||||
| APPLICATION | COST PER USER || PERIOD |
| EXCHANGE | $2.00 || 1 |
| ENTERPRISE | $1.75 || 1 |
| ≈ | ≈ |||
| EXCHANGE | $3.07 || 24 |
| ENTERPRISE | $0.95 || 24 |
| AVERAGE USAGE ||||
| EXCHANGE | $2.73 || |
| ENTERPRISE | $1.36 || |

FIG. 4A

| RECOMMENDED APPLICATION RESOURCE SCENARIOS ||
|---|---|
| EXAMPLE | RECOMMENDATION |
| A | MAINTAIN CURRENT APPLICATIONS - EXCHANGE AND ENTERPRISE |
| B | ISV OFFERS LOWER COST PER USER APPLICATION OPTIONS FOR EXCHANGE AND ENTERPRISE - SHOULD RENEGOTIATE |
| C | LOWER COST PER USER BY SWITCHING TO GOOGLE GMAIL AND MICROSOFT SQL SERVER |

FIG. 4B

GENERATING CUSTOMIZED BUILD OPTIONS FOR CLOUD DEPLOYMENT MATCHING USAGE PROFILE AGAINST CLOUD INFRASTRUCTURE OPTIONS

FIELD

This invention relates generally to products and services, more particularly, to systems and methods for cloud computing related services and products.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

Typically, when a user utilizes a cloud, the user must track the software applications executed in the cloud and/or processes instantiated in the cloud. For example, the user must track the cloud processes to ensure that the correct cloud processes have been instantiated, that the cloud processes are functioning properly and/or efficiently, that the cloud is providing sufficient resources to the cloud processes, etc. Due to the user's requirements and usage of the cloud, the user may have many applications and/or processes instantiated in a cloud and may be utilizing multiple independent clouds to support the cloud processes. As such, the user may have difficulty determining an optimal deployment architecture in the cloud as the applications and/or processes are instantiated or terminated over time. Additionally, the user may have difficulty tracking the applications and/or processes utilized by the cloud processes. For example, as the applications and/or processes run in the clouds, these processes may need adjustment to, for example, reduce cost, maximize user response time, minimize downtime, etc. As such, the initial set of application resources used in the clouds may no longer be optimal for or even capable of supporting the user's functional requirements.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 4A illustrates an exemplary report generated by the decision system, according to various embodiments;

FIG. 4B illustrates exemplary recommendations according to various embodiments;

DETAILED DESCRIPTION OF EMBODIMENTS

Figure 1:
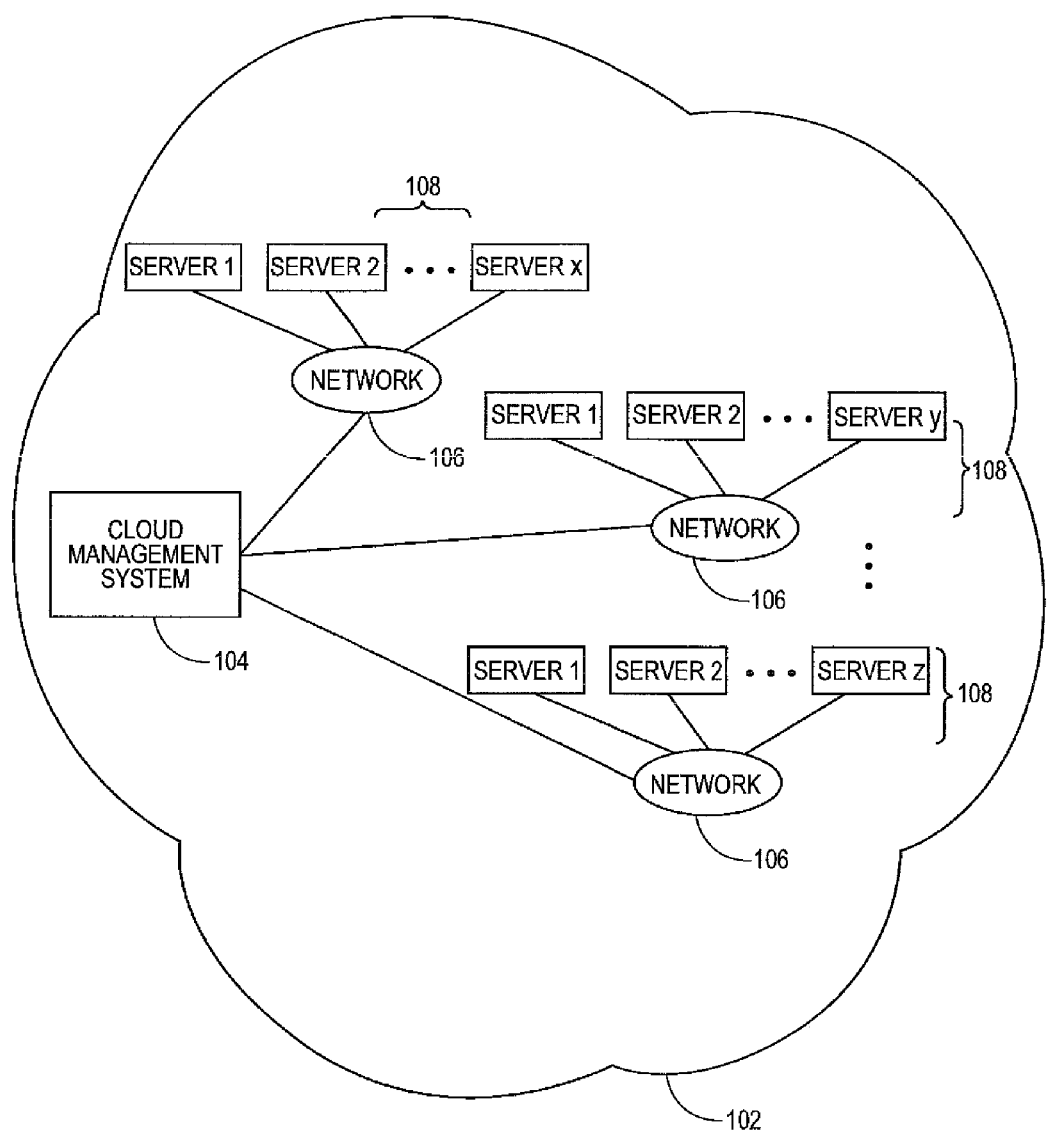
FIG. 1 illustrates an overall cloud system architecture in which various embodiments of the present teachings can be practiced.

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for independently monitoring applications and appliances in cloud computing environments. More particularly, embodiments relate to platforms and techniques in which a decision system can monitor applications, application appliances, and/or processes running in a cloud computing environment, analyze data (e.g., usage history data) associated with the running applications and/or processes, and provide customized application resource build options to a user. As used herein, processes is intended to include applications, application appliances (applications with a mini OS), operating systems, other types of software, etc.

According to embodiments, a decision system can be configured to provide recommendations, suggestions, alternatives, and options for customized application resource build options to a user of a cloud computing environment. In particular, according to embodiments, the decision system can be configured to receive data related to a user's application usage history in a specific cloud computing environment, for example, usage of cloud resources, number and type of computing processes instantiated, software programs utilized by the computing processes, user response time, cost per user, users per instance of application, application version, add-ons, and the like. Once the data is received, the decision system can be configured to determine customized sets of application resources for the user in either the same cloud computing environment or different cloud computing environments. The determination of the customized sets of application resources can be based on the received application usage history data and the available application resources in a given cloud computing environment. The determination of the customized sets of application resources can also be based on user requirements, for example, a list of applications, a list of types of applications, a list of application functionalities, a list of application appliances, a list of types of application appliances, a list of application appliance functionalities, operating system, etc. Likewise, the decision system can be configured to provide reports to the user describing the information collected about the applications executed and/or processes instantiated in the cloud related to the collected usage history and any additional user specified requirements.

In embodiments, the user can decide to instantiate the recommended customization application resources by sending, for example, a confirmation to the decision system. The user can also decide which if any additional recommendations, for example, add-ons, the user wants to instantiate as well. Included in the user's decision as to what applications/appliances to instantiate can be how each of the applications/appliances is offered. For example, an application can be offered as a stand alone instance, as a lease, or as software as a service. Part of a user's decision can include the service level agreements (SLAs) and the like.

According to embodiments, the decision system can be configured to determine one or more customized set of application resources. In particular, the decision system can supply information to a user regarding the determined customized set of application resources and any additional recommended add-ons. The customized set of application resources can be used to migrate the user from a first cloud computing environment to a second cloud computing environment, and/or to change the current user's cloud computing environment's instantiated applications.

By generating customized sets of application resources, the decision system can enable the user to track computing processes instantiated in clouds without devoting time and manpower to tracking the user's applications and/or processes. As such, the user can ensure that computing processes in the cloud are instantiated and running properly and efficiently. Likewise, by generating and providing customized sets of application resources, the decision system can allow the user to choose an optimal application build without constantly monitoring the applications/appliances in the clouds.

FIG. 1 illustrates an overall cloud computing environment, in which systems and methods for the management of subscriptions of cloud-based virtual machines can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines can be managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, because the set of instantiated virtual machines or other resources may be intended to operate on a purely transient or temporary basis. In embodiments, other hardware, software or other resources not strictly located or hosted III the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select a group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in a set of resource servers 108 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
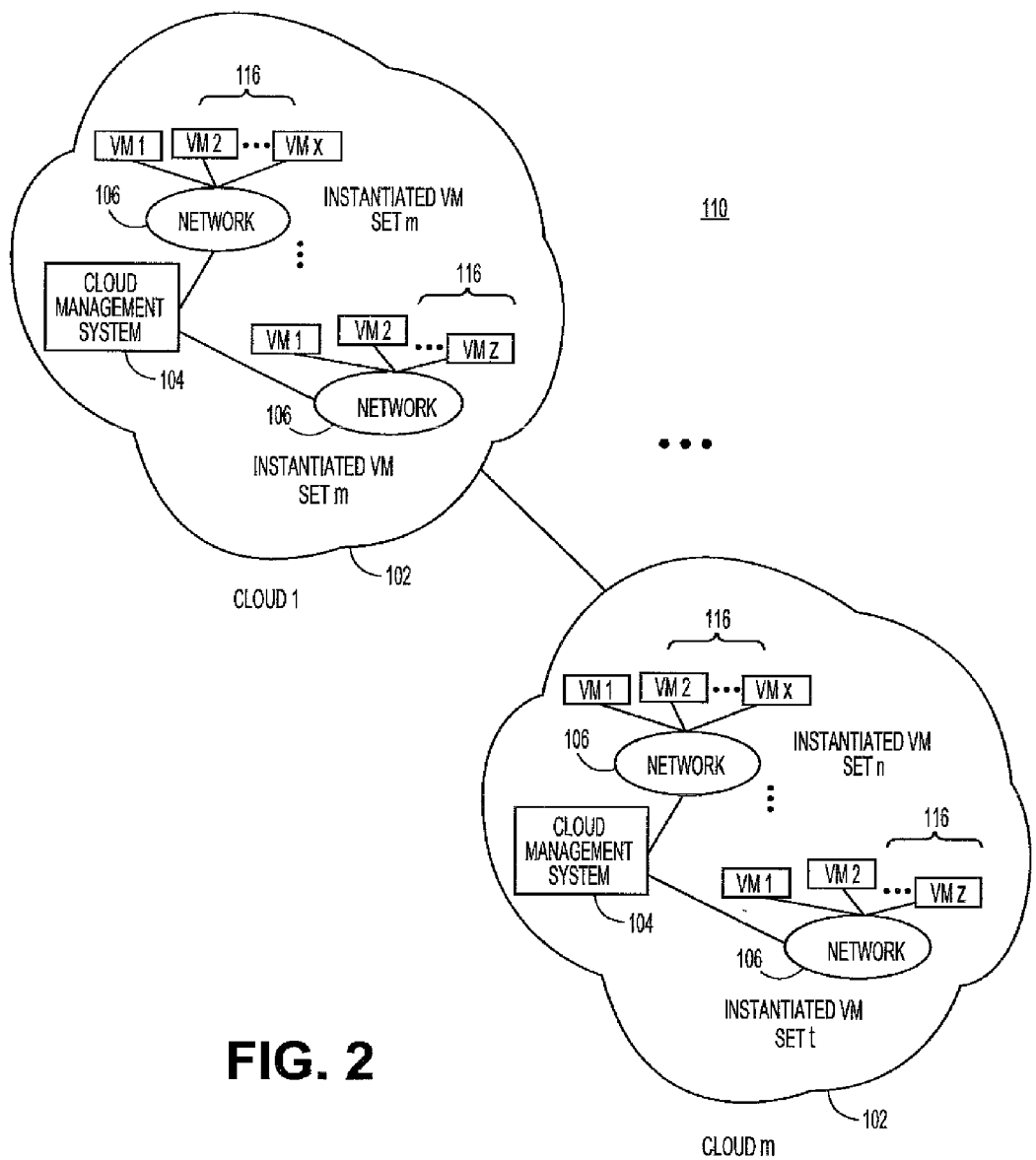
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other number of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates, and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
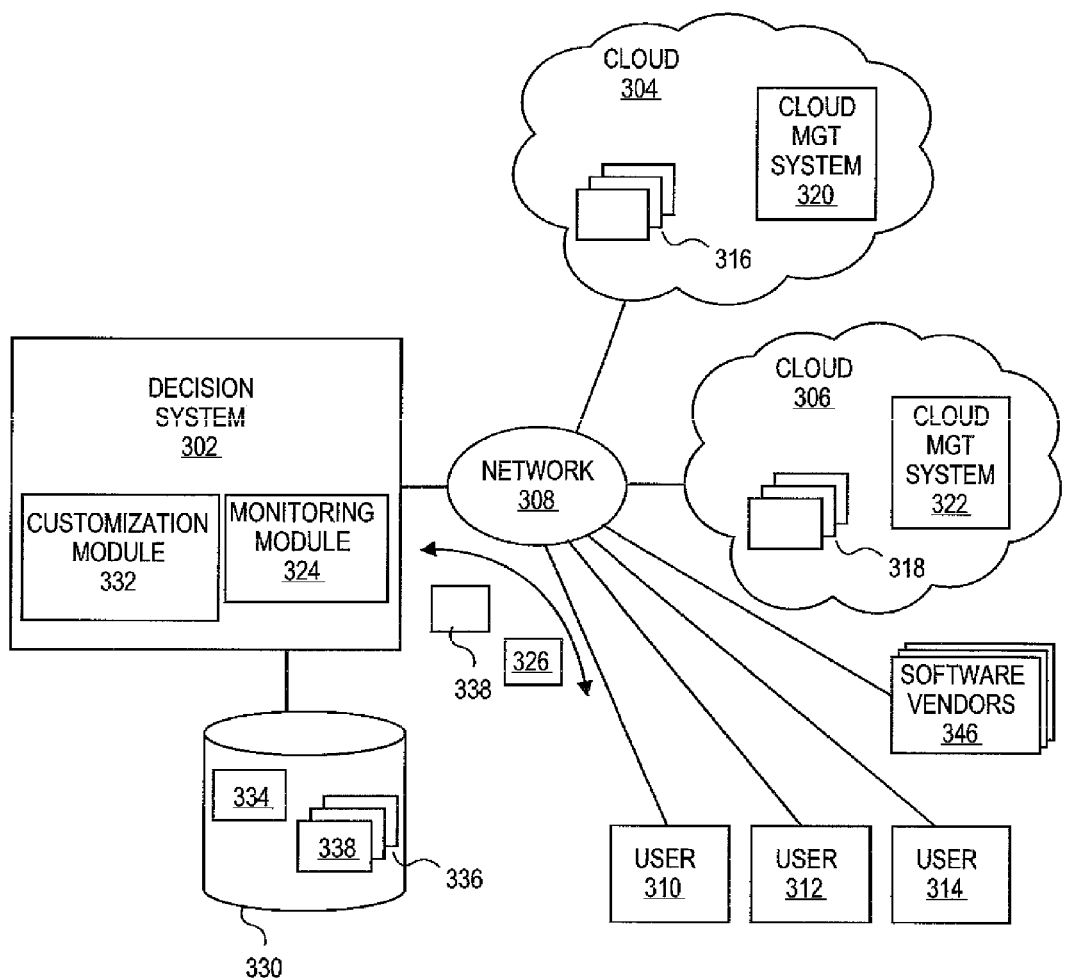
FIG. 3 illustrates an overall system in which a decision system can analyze data associated with applications and/or processes running in a cloud computing environment and provide a set of customized application resource build options to a user, according to various embodiments.

FIG. 3 illustrates aspects in which a decision system 302 can communicate with clouds 304 and 306, via one or more networks 308, according to various embodiments. While FIG. 3 illustrates various components of the decision system 302 and the clouds 304 and 306, one skilled in the art will realize that components can be added or removed.

In embodiments, one or more users 310, 312, and 314 can utilize one or more of the clouds 304 and 306 to support computing processes of the user 310, 312, and 314. For example, the user 310 can utilize the cloud 304 to support computing processes 316 and can utilize cloud 306 to supporting computing processes 318. The computing processes 316 and 318 can be any type of computing processes, such as virtual machines, software appliances, software programs (e.g. OS, applications and the like), etc. The users 310, 312, and 314 can be any type of entity, such as individual users, corporations, companies, universities, and the like, that utilizes the clouds 304 and 306 to support computing processes. While FIG. 3 will be described with reference to user 310, one skilled in the art will realize that the processes and methods can be applied to any of the users 310, 312, and 314 or any other users. Additionally, while FIG. 3 illustrates users 310, 312, and 314, one skilled in the art will realize that methods and processes can apply to any number of users.

In embodiments, the clouds 304 and 306 can be any type of cloud computing environments, such as the cloud computing environments described above in FIGS. 1 and 2. As described above, the clouds 304 and 306 can include any number of computing systems to support the computing processes in the cloud. The computing systems can be any type of computing systems capable of supporting computing processes, such as servers, laptops, desktops, and the like. The computing systems can include a number of hardware resources, which are used to support the computing processes (e.g. virtual machines, software appliances, processes and the like) in the clouds 304 and 306, such as processors, memory, network hardware and bandwidth, storage devices, etc. Additionally, the clouds 304 and 306 can include a cloud management system 320 and 322, respectively. The cloud management systems 320 and 322 can be supported by the computing resources of the clouds 304 and 306, respectively.

In embodiments, the cloud 304 and/or 306 can be operated and controlled by any number of entities. For example, the cloud 304 and/or the cloud 306 can be owned and/or operated by a cloud vendor, such as Amazon™, Inc., in order to provide the services of the the cloud 304 and/or the cloud 306 to subscribers and customers. Likewise, for example, the cloud 304 and/or the cloud 306 can be owned and/or operated by one or more of the users 310, 312 and 314, and the resources of the the cloud 304 and/or the cloud 306 can be used by the entity, internally, to support various computing processes. As such, in either case, the cloud 304 and the cloud 306 can be configured to include hardware, described above, and software resources to support computing processes. For example, if the cloud 304 and/or the cloud 306 is operated by a cloud vendor, the software resources can include operating systems, such as a distribution of Linux provided by Red Hat™ Corporation, and various software programs requested or typically desired by subscribers, such as middleware applications, web hosting applications, electronic mail (email) applications, and the like. Likewise, for example, if the cloud 304 and/or the cloud 306 is operated by an entity for internal use, the software resources can include software resources required to support the specific internal uses. For instance, the cloud can be utilized by a corporation to perform simulations on a product and the software resources can include operating systems and application programs to run the simulations.

In embodiments, the one or more networks 308 can be or include the Internet, or other public or private networks. The one or more or more networks 308 can be or include wired, wireless, optical, and other network connections. One skilled in the art will realize that the one or more networks 308 can be any type of network, utilizing any type of communication protocol, to connect the computing systems.

In embodiments, due to the dynamics of the computing processes 316 and 318, the user 310 can desire to actively monitor the computing processes 316 and 318. For instance, the user 310 can desire to monitor the computing processes 316 and 318 to ensure that the appropriate computing processes are running and functioning properly. Likewise, the user 310 can desire to monitor the computing processes 316 and 318 to determine the usage of the resources of the clouds 304 and 306 for billing and other purposes. Additionally, the computing processes 316 and 318 can spawn new computing processes in the clouds 304 and 306, which the user 310 can desire to monitor.

In embodiments, the decision system 302 can be configured to monitor the clouds 304 and 306 for the one or more users 310, 312, and 314. In particular, the decision system 302 can be configured to monitor the computing process associated with the users 310, 312, and 314 and supported by the clouds 304 and 306. The decision system 302 can be configured to subscribe the users 310, 312, and 314 to the monitoring services provided by the decision system 302. Once subscribed, the decision system 302 can be configured to receive access information from the users 310, 312, and 314. The decision system 302 can be configured to utilize the access information to access and communicate with the clouds 304 and 306 in order to monitor the computing processes supported by the clouds 304 and 306 and to collect information about the computing processes. Additionally, the decision system 302 can be configured to report any information collected while monitoring the users 310, 312, and 314.

In embodiments, the decision system 302 can be operated by an entity that provides the monitoring services to the users 310, 312, and 314. The monitoring services can be provided to the users 310, 312, and 314 for a fee. The decision system 302 can be supported by one or more computing systems, such as servers, laptops, desktops, and the like. The decision system 302 can include conventional components of a computing system, such as such as processors, memory, network interfaces, storage devices, etc.

In embodiments, to monitor the computing processes 316 and 318, the decision system 302 can be configured to include a monitoring module 324. The monitoring module 324 can be configured to cooperate and communicate with the users 310, 312, and 314 to subscribe the user 310, 312, and 314 to the monitoring services and to report any gathered information to the users 310, 312, and 314. The monitoring module 324 can be configured to monitor one or more aspects of the running processes based on one or more predefined parameters or a set of parameters defined by the user 310. The parameters can include, for example, types of applications, application functionalities, users per instance of an application, maximum users per instance of an application, cost per user, fail-overs, downtime, response time, etc. Likewise, the monitoring module 324 can be configured to cooperate and communicate with the clouds 304 and 306 to monitor computing processes supported by the cloud 304 and 306. The monitoring module 324 can be implemented as a software program that is configured to execute on the decision system 302. Likewise, the monitoring module 324 can be implemented as a portion of other software programs configured to execute on the decision system 302. In either case, the monitoring module 324 can be configured to include the necessary logic, commands, instructions, and protocols to perform the processes described below. In any implementation, the monitoring module 324 can be written in any type of conventional programming language such as C, C++, JAVA, Perl, and the like. Additionally, the monitoring module 324 can be stored in computer readable storage devices or media (CD, DVD, hard drive, portable storage memory, etc.) whether local to the decision system 302 or remotely located.

In embodiments, once the user 310 has subscribed, the monitoring module 324 can be configured to generate and maintain a set 336 of usage history data 338. Each usage history data 338 in the set 336 can be configured to store an identification of the running processes, such as computing processes 316 and 318, the user associated with the the running processes, and any information collected during the monitoring of the computing processes 316 and 318. The monitoring module 324 can maintain the set 336 of usage history data 338 in a repository 330, such as a database. The repository 330 can be stored in computer readable storage devices or media (CD, DVD, hard drive, portable storage memory, etc.) whether local to the decision system 302 or remotely located.

In embodiments, once the user 310 is subscribed, the monitoring module 324 can be configured to communicate with the clouds 304 and 306 to monitor the computing processes 316 and 318. For example, the monitoring module 324 can be configured to retrieve the usage history data 338 associated with the user 310 and/or the computing processes 316 and 318 associated with the user 310. To retrieve the utilization data 338, the monitoring module 324 can be configured to include the necessary logic, commands, instructions, and protocols to search the set 336 of usage history data 338 and to retrieve the usage history data 338 and the access information for the user 310. For instance, the monitoring module 324 can be configured to include the necessary queries and commands to communicate with and retrieve information from the repository 330.

The monitoring module 324 can be configured to monitor the computing processes 316 and 318 and collect information such as usage history of cloud processes 316 and 318, details of the computing processes 316 and 318, and the like. For example, for usage history of the cloud process 316 and 318, the monitoring module 324 can be configured to collect information, such as type of computing processes 316 and 318, (e.g., messaging, security, language, network, financial, data processing, data management, web management, package version, archival, etc.), costs per user, response times, fail-overs, downtime, types of add-ons used, instances per user, the number of application resources used in the clouds 304 and 306, the duration the software resources are utilized, the current fees for using the clouds 304 and 308, etc.

In embodiments, in order to monitor and collect information about the computing processes 316 and 318, the monitoring module 324 can be configured to communicate with the cloud management systems 320 and 322 of the clouds 304 and 306, respectively. For example, the monitoring module 324 can be configured to communicate with the cloud management systems 320 and 322 in order to collect information about the usage of the clouds 304 and 306. Likewise, the monitoring module 324 can be configured to communicate with the computing processes 316 and 318 to collect information about the details of the computing processes 316 and 318. For example, the monitoring module 324 can be configured to communicate with virtual machine monitors supporting virtual machines, with the virtual machines directly, with software appliances, with the software programs, and the like.

In embodiments, to communicate with the clouds 304 and 306, the monitoring module 324 can be configured to establish a connection with the cloud 304 and 306 via the network 308. In particular, the monitoring module 324 can be configured to establish a connection with the cloud management systems 320 and 322 and/or a connection to the computing processes 316 and 318. To achieve this, the monitoring module 324 can be configured to include the necessary logic, instructions, commands, and protocols to communicate with the cloud management systems 320 and 322 and/or a connection to the computing processes 316 and 318 via network 308. For example, the monitoring module 324 can be configured to establish a connection using network protocols, such as Internet protocol (IP), user datagram protocol (UDP), transmission control protocol (TCP), hypertext transfer protocol (HTTP), file transfer protocol (FTP), electronic mail (email) protocols, or any other type of known or proprietary network protocol.

In embodiments, the monitoring module 324 can be configured to monitor the computing processes 316 and 318 periodically for a specified duration and/or upon the occurrence of any events. For example, the monitoring module 324 can be configured to monitor the computing processes 316 and 318 upon the subscription of the user 310 and periodically (every hour, once a day, etc.) while the user 310 is subscribed.

In embodiments, once information about the computing processes 316 and 318 is collected, the monitoring module 324 can be configured to store the collected information in the usage history data 338 associated with the user 310. As such, the monitoring module 324 can be configured to classify the collected information and store the information in the usage history data 338. To achieve this, the monitoring module 324 can be configured to include the necessary logic, commands, instructions, and protocols to sort and classify the collected information and store the sorted and classified information in the usage history data 338.

In embodiments, when the information is collected, the monitoring module 324 can be configured to generate reports to provide the collected information to the user 310. The monitoring module 324 can be configured to generate the report in any format to display the collected information to the user 310. To achieve this, the monitoring module 324 can include the necessary logic, commands, instructions, and protocols to retrieve the collected information from the usage history data record 338 and organize the collected information into the reports.

In embodiments, the monitoring module 324 can be configured to generate and provide the reports to the user upon the occurrence of any number of events. For example, the monitoring module 324 can be configured to provide the reports upon request of the user 310 and/or periodically. The monitoring module 324 can be configured to receive the request for the reports via an interface 326. Likewise, the monitoring module 324 can be configured to provide the reports via the interface 326. Additionally, the monitoring module 324 can provide the reports to the user 310 via the network 308 utilizing any type of network protocol, such as Internet protocol (IP), user datagram protocol (UDP), transmission control protocol (TCP), hypertext transfer protocol (HTTP), file transfer protocol (FTP), electronic mail (email) protocols, or any other type of known or proprietary network protocol.

In embodiments, the decision system 302 can be configured to utilize the information collected during the monitoring to provide other services to the user 310, 312, and 314. In particular, the decision system 302 can be configured to verify that the software programs utilized by the computing processes 316 and 318 instantiated in the clouds 304 and 306 comply with software license requirements. For example, as the computing processes 316 and 318 run, the computing processes 316 and 318 can change over time. For instance, the computing processes 316 and 318 can spawn new computing processes which can utilize new instances of software programs.

In embodiments, to generate customized sets of application resources, the decision system 302 can be configured to include a customization module 332. The customization module 332 can be implemented as a software program that is configured to execute on the decision system 302. Likewise, the customization module 332 can be implemented as a portion of other software programs, such as monitoring module 324, configured to execute on the decision system 302. In either case, the customization module 332 can be configured to include the necessary logic, commands, instructions, and protocols to perform the processes described below. In any implementation, the customization module 332 can be written in any type of conventional programming language such as C, C++, JAVA, Perl, and the like. Additionally, the customization module 332 can be stored in computer readable storage devices or media (CD, DVD, hard drive, portable storage memory, etc.) whether local to the decision system 302 or remotely located.

In embodiments, the customization module 332 can be configured to generate and to maintain a set of application resource rules 334. The set of application resource rules 334 can be configured to store rules or best practices for deploying application resources in computing cloud environment such as the clouds 304 and 306. The set of application resource rules 334 can be configured to include requirements for software programs provided by the owners and operators of the clouds 304 and 306. The set of application resource rules 334 can also be configured to include resources available in the clouds 304 and 306. Likewise, the set of application resource rules 334 can be configured to include requirements or preferences for software programs provided by software vendors 346, which can be software vendors independent of the decision system 302 and the clouds 304 and 306, such as independent software vendors (ISVs).

In embodiments, the set of application resource rules 334 can be configured in any format and can include any information that provides the necessary logic, such as algorithms and/or heuristics, for generating customized application build options based on the information collected during the monitoring of the computing processes 316 and 318. For example, the set of deployment rules 334 can include any number rules based on the costs of running processes 316 and 318. For instance, a rule can specify that if the a cost per user for an application over the course of a period of time is more than predetermined amount, then a different application with a lower cost per user should be used. Rules can relate to costs, downtime, fail-overs, etc., and can be customized based on a user's history usage data and specific user requirements. The customization module 332 can be configured to store the set of application resource rules 334 in the repository 330.

While FIG. 3 shows the decision system 302 as maintaining a set of application resource rules 334, one skilled in the art will realize that the decision system 302 can maintain multiple sets of application resource rules. Additionally, while FIG. 3 describes the decision system 302 accessing the set of application resource rules 334, one skilled in the art will realize that the decision system 302 can be configured to allow other systems to access the set of application resource rules 334, for example, by providing an API to the set of application resource rules 334.

Various data definitions for defining the format of data generated and received by the decision system 302 can be utilized. For example, a data definition in the form of document type definition can be used and one skilled in the art will realize that the any type of data definitions can used. The data definition can include metadata for data utilized by the decision system 302 to generate customized application resource build options, such as an identifier of a running application, a start date and time, a requester identifier, and data parameters such as a configuration of a current application (e.g., type of application, users per instance, cost per user, number of instances, a time duration, a number of time intervals, downtime, fail-overs, response time, software license information, and the like.

Similarly, various data sets can be generated by the decision system 302 in accordance to the data definitions used. For example, a data set can include data utilized by the decision system 302 to generate customized sets of application resources, such as an identifier of a running application, a start date and time, and data parameters such as a configuration of the current application (e.g., name of application), a time duration, a number of time intervals, a cost per user, and the like.

In embodiments, the decision system 302 can be configured to provide a report 430 to advise the user of deployment options and parameters, an exemplary instance of which is illustrated in FIGS. 4A thru B. As shown in FIG. 4A, a user or company identification 405, a start date 410, a start time 415, and a cloud identification 420 can be used as inputs and/or identifiers for the application analysis report 430. The information provided for these and the other inputs, monitoring data, and recommendations are exemplary and can be changed and/or added to per a user's requirements. In the illustrated example, shown in FIG. 4A, the monitoring module 324 of the decision system 302 is monitoring Corporation A, starting on May 15, 2010 at 00:00 in Cloud A. The parameters for the monitoring include, but are not limited to, the applications 425 being monitored, the total duration 460 of the monitoring, and the periods 470 during the total duration 460, e.g., every hour for a total of 24 hours. As shown, a messaging application (e.g., Microsoft® Exchange) and a database management application (e.g., Oracle® Enterprise) are being monitored for a total duration 460 of twenty four hours with a period 470 of one hour. Other examples of types of applications that can be monitored include, security management, language management, network management, financial management, database processing, web management, package versioning, archival management, application version management and/or appliance version management, add-ons, and the like. As is known in the art, various vendors (ISVs) can supply such applications and/or appliances, e.g., Red Hat, Microsoft, Apple, IBM, Oracle, and the like.

An example of the usage history data collected by the monitoring module 324 is shown in 475. The information includes, but is not limited to, the Application 480, the cost per user 482, and the period recorded 484. Other information can include, for example, users per instance, number of instances, version of application, response time (user, network, etc.), fail-over rate, downtime, cost per instance, cost per ISV, and the like. The example data includes each application 480 monitored (e.g., Exchange and Enterprise) and a cost per user 482 for each application for each period 484. For example, during period 1, Exchange cost $2.00 per user and Enterprise cost $1.75 per user. However the cost per user 482 can dynamically change over the total duration, e.g., 24 periods, Exchange costs $3.07 per user and Enterprise costs $0.95 per user at period 24. Each cost per user 482 during each period is an average over that period, but the period can be varied, per minute, per day, etc., as requested by the user and thus the average can change as well. Finally, at the end of the report 430, an average 485 of each parameter monitored for each application over the total duration 460 is shown. As illustrated, the average cost per user 495 is shown for each application 490, for Exchange, the average cost per user was $2.73 and for Enterprise, the average cost per user was $1.36.

FIG. 4B shows various example recommendations that can be supplied to a user based on the usage history data 338 collected by monitoring module 324. The recommendations are determined by customization module 332 based in part on application resource rules 334. In addition, the user can add requirements as desired to the application resource rules 334. Application build options can include, but are not limited to, for example, recommendations to maintain applications as is, to negotiate with independent service vendors (ISVs) to lower costs per user, and/or to change applications. One skilled in the art will understand that other build options or types of computing resources can also be used.

In FIG. 4B three example recommended application resource scenarios 497 are supplied, examples A, B, and C. As will be understood, one recommendation will typically be supplied to a user, however, if certain situations, multiple recommendations can also be supplied. For example, if a user supplies the customization module 332 with multiple possible requirements that could conflict with each other, such as minimizing the cost per user as compared to using the most up to date application version of an application. In addition, the recommendation can be tailored for a migration from one Cloud to another Cloud, or to optimize and/or adjust the application(s) instantiated in the Cloud being monitored.

In example A the decision system 302 decided that for Corporation A, using Exchange and Enterprise as monitored in Cloud A is the recommended build option. In contrast, in example B, decision system 302 determines that the ISV offering the applications has lower cost per user options for Exchange and Enterprise and therefore recommends that the user re-negotiate the terms of the user's service level agreements (SLAs). Finally in example C, decision system 302 determines that completely different applications, for example, Google® Gmail and Microsoft® SQL Server are better applications for Corporation A to use in Cloud A.

In addition to determining the appropriate application, version, etc., decision system 302 can also recommend add-ons, for example, additional applications, appliances, widgets, plug-ins, snap-ins, themes, extensions, etc., that a user can decide to apply to their application build. An example of such an add-on for a messaging module can be the functionality of having team scheduling and/or resource scheduling. Additional examples of recommendation options can include integrating security features, adding a language module, etc. As will be understood, various combinations of applications/appliances and corresponding add-ons can be recommended by decision system 302 based on the usage history data and any additional user requirements.

Other additional information that can be supplied and/or provided to the user can include how each of the recommended applications/appliances is offered in the cloud. For example, the applications/appliances can be provided as a stand alone instance, a lease, or as software as a service. This information can be incorporated in the recommendations supplied to the user and/or can be determined separately once a specific application/appliance is selected. It will be understood that additional methods of supplying the applications/appliances are included.

Figure 5:
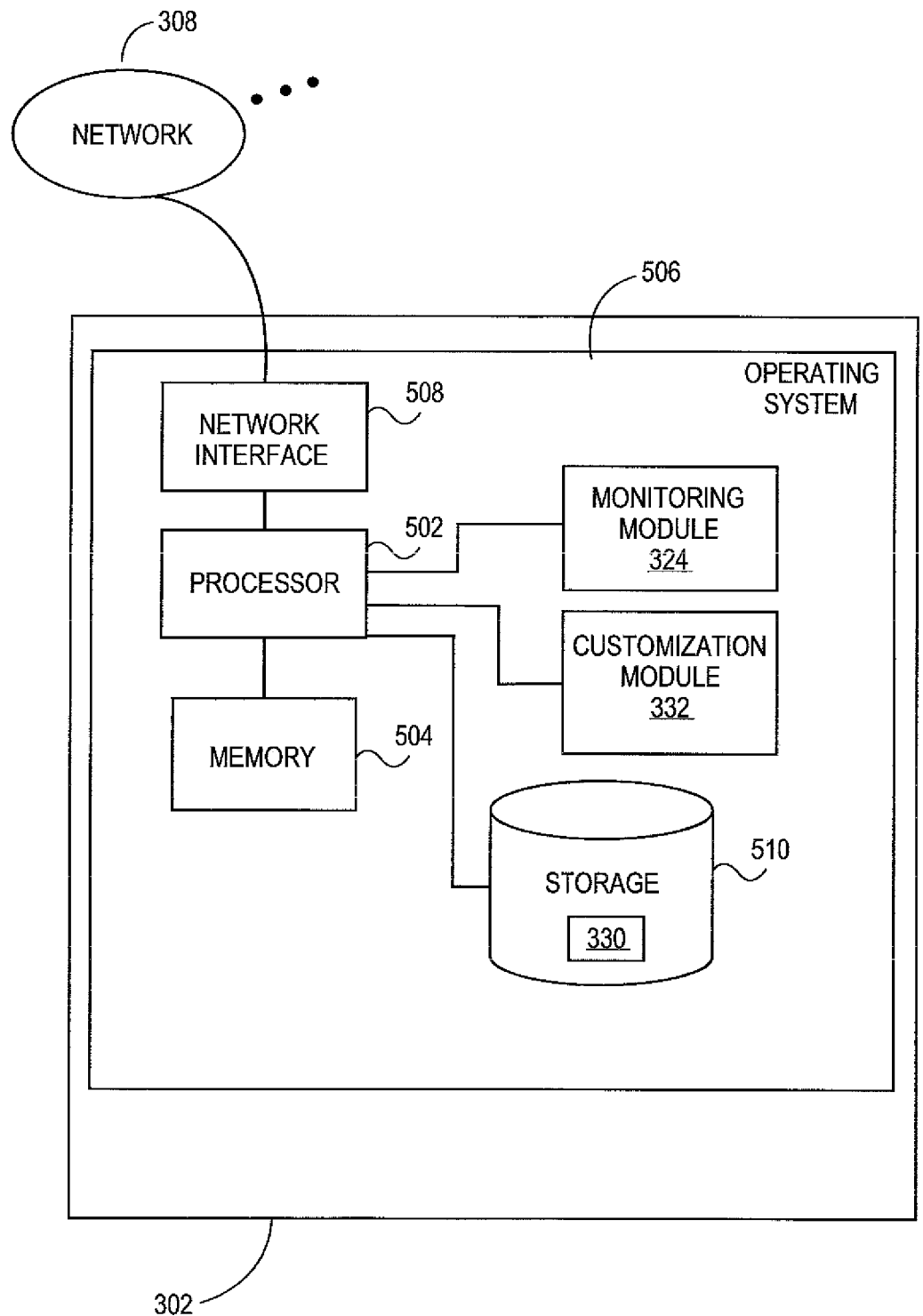
FIG. 5 illustrates an exemplary hardware configuration for a decision system, according to various embodiments.

FIG. 5 illustrates an exemplary diagram of hardware and other resources that can be incorporated in the decision system 302, which can implement the monitoring module 324 and the customization module 332, and configured to communicate with the clouds 304 and 306 via one or more networks 308, according to embodiments. In embodiments as shown, the decision system 302 can comprise a processor 502 communicating with memory 504, such as electronic random access memory, operating under control of or in conjunction with operating system 506. Operating system 506 can be, for example, a distribution of the Linux™ operating system, such as SELinux, the Unix™ operating system, or other open-source or proprietary operating system or platform. Processor 502 also communicates with one or more computer readable storage medium 510, such as hard drives, optical storage, and the like, which can store the repository 330. Processor 502 further communicates with network interface 508, such as an Ethernet or wireless data connection, which in turn communicates with one or more networks 308, such as the Internet or other public or private networks.

Processor 502 also communicates with the monitoring module 324 and the customization module 332 to execute control logic and allow for monitoring computing processes as described above and below. Other configurations of the decision system 302, associated network connections, and other hardware and software resources are possible.

While FIG. 5 illustrates the decision system 302 as a standalone system including a combination of hardware and software, the decision system 302 can include multiple systems operating in cooperation. The monitoring module 324 and the customization module 332 can be implemented as a software application or program capable of being executed by the decision system 302, as illustrated, or other conventional computer platforms. Likewise, the monitoring module 324 and the customization module 332 can also be implemented as a software module or program module capable of being incorporated in other software applications and programs. In either case, the monitoring module 324 and the customization module 332 can be implemented in any type of conventional proprietary or open-source computer language. When implemented as a software application or program code, the monitoring module 324 and the customization module 332 can be stored in a computer readable storage medium, such as storage 510 accessible by the decision system 302. Likewise, during execution, a copy of the monitoring module 324 and the customization module 332 can be stored in the memory 504.

Figure 6:
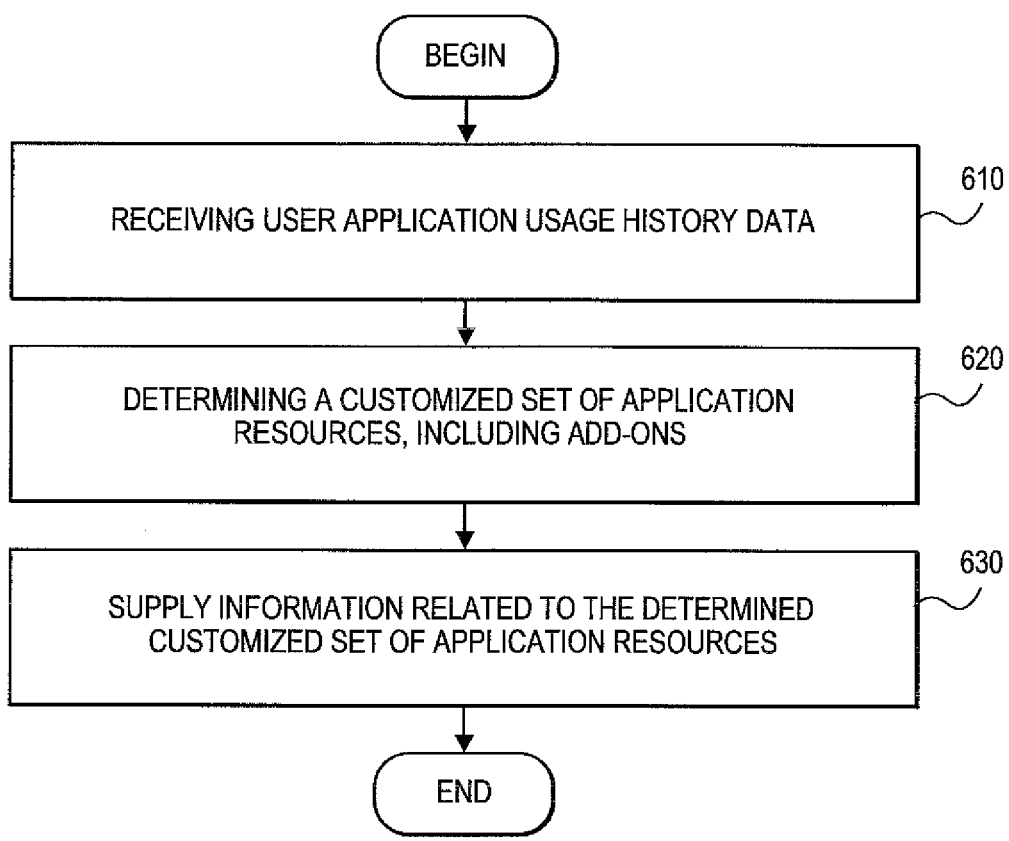
FIG. 6 illustrates a flowchart of an exemplary process for monitoring applications and/or processes running in a cloud computing environment and generating one or more sets of customized application resources, according to various embodiments.

FIG. 6 illustrates a flowchart of an exemplary process for monitoring applications and/or processes running in a cloud computing environment and generating one or more customized application resource recommendations, according to embodiments. In the exemplary process, a decision system (e.g., decision system 302 as shown in FIG. 3) can be configured to provide recommendations, suggestions, alternatives, and options for customized application builds to users (e.g., users 310, 312, and/or 314) of a cloud computing environment (e.g., clouds 304 and/or 306). As processing begins the decision system in 610 can receive user application usage history data (e.g., usage history data 338) from, for example, monitoring module 324. In embodiments, the usage history data can dynamically determine a set of parameters based on a configuration of the applications that the user is associated with and/or based on user requirements, etc. The decision system can also retrieve default or predefined sets of parameters (e.g., data definitions discussed above) from a computer readable storage medium. For example, the decision system can retrieve predefined parameters from a repository (e.g., repository 330) or communicate with cloud management systems (e.g., cloud management systems 320 and/or 322), software vendors (e.g., software vendors 346), or other sources (e.g., the Internet) to retrieve predefined parameters. The parameters can include, for example, a configuration of a current application (e.g., instances, cost per user, etc.), a time duration, a number of time intervals, response time, a network traffic level, a storage utilization, a software license information, and the like. One skilled in the art will realize that the other parameters or types of parameters can be used.

While not shown in 610, the decision system can monitor the applications and/or computing processes as they run in a current or previous deployment in a cloud computing environment. The decision system receives this monitoring data, including the duration of time and can store it in a repository.

In 620, the decision system can determine a customized set of application resources for the user by, for example, retrieving rules, algorithms, and/or heuristics for generating application build options based on the received usage history and any addition requirements. The decision system can retrieve the rules from a computer readable storage medium (e.g., application resource rules set 334 in repository 330). In 620, the decision system can also generate one or more customized sets of application resources by using the application resource rules to evaluate the usage history data and/or other parameter data associated with the applications and/or computing processes. For instance, if the cost per user of the applications and/or computing processes over a specified duration of time is less than a predetermined amount, then the decision system 302 can recommend that the applications and/or computing processes be maintained in the cloud computing environment. For another instance, if the applications and/or computing processes have a higher than predetermined cost per user, then the decision system 302 can recommend that the applications and/or computing processes be run on different applications having a lower cost per user.

In step 630, the recommendation determined in step 620, including information about the customized set of application resources is supplied to the user. The process can end after 630, but the process can return to any point and repeat and/or the process can receive a decision from the user to apply/instantiate the supplied recommendations.

Additional steps, while not shown, can include receiving a confirmation from the user that the recommended customized application resources should be instantiated and then instantiating the recommendations. Alternatively or in addition, the user can confirm that one or more of the add-on recommendations is also selected and should then be instantiated. As discussed above, the recommendations can include migrating to a new cloud or clouds or instantiating the recommendations in the current cloud or clouds. Another step can be determining how the selected application resources are to be offered to the user, e.g., single instance, lease, software as a service, etc.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the aspects have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
    collecting, by a processor, data representing application usage history from a current deployment and a previous deployment of a first cloud computing environment;
    determining over a period of time, by the processor, a customized set of application resources in a second cloud computing environment to be used in view of temporary combinations of resources in the second cloud computing environment reported in the data representing application usage history;
    receiving a selection of one or more additional application resources to add to the customized set of application resources;
    determining over the period of time, by the processor, a cost per user of the customized set of application resources and the selected one or more additional application resources in the second cloud computing environment;
    supplying, by the processor, a recommendation regarding whether to migrate from the first cloud computing environment to the determined customized set of application resources and the selected one or more additional application resources in the second cloud computing environment in view of the cost per user being higher or lower than an amount over the period of time; and
    migrating one or more of the customized set of application resources or additional application resources in response to the recommendation.

2. The method of claim 1, further comprising:
    instantiating the determined customized set of application resources in the second cloud computing environment.

3. The method of claim 1, wherein the customized set of application resources comprises at least one application, application appliance, operating system, application package, application version, add-on, or software module.

4. The method of claim 1, wherein determining a customized set of application resources in the second cloud computing environment further comprises:
    identifying the additional application resources based on available application modules in the second cloud computing environment; and
    supplying information regarding the identified additional application resources.

5. The method of claim 4, wherein the additional application resources comprise at least one of messaging, security, language, network management, financial management, data processing, data management, web management, package version, or archival management.

6. The method of claim 4, further comprising:
    supplying information about the additional application resources to a user; and
    instantiating the selected additional application resources.

7. The method of claim 1, wherein determining a customized set of application resources in the second cloud computing environment, further comprises:
    determining a customized set of application resources for each of a plurality of cloud computing environments; and
    supplying information regarding the determined customized set of application resources for each of the plurality of cloud computing environments.

8. The method of claim 1, further comprising:
    receiving a set of application resource requirements comprising at least one of a list of applications, a list of types of applications, a list of application functionalities, a list of application appliances, a list of types of application appliances, or a list of application appliance functionalities.

9. A system comprising:
    a memory;
    a processor operatively coupled to the memory, the processor to:
        collect data representing application usage history from a current deployment and a previous deployment of a first cloud computing environment;
        determine over a period of time a customized set of application resources in a second cloud computing environment to be used in view of temporary combinations of resources in the second cloud computing environment reported in the data representing application usage history;
        receive a selection of one or more additional application resources to add to the customized set of application resources;
        determine over the period of time, a cost per user of the customized set of application resources in the second cloud computing environment;
        supply a recommendation regarding whether to migrate from the first cloud computing environment to the determined customized set of application resources and the selected one or more additional application resources in the second cloud computing environment in view of the cost per user being higher or lower than an amount over the period of time; and
        migrate one or more of the customized set of application resources or additional application resources in response to the recommendation.

10. The system of claim 9, wherein the processor further instantiates the determined customized set of application resources in the second cloud computing environment.

11. The system of claim 9, wherein determining a customized set of application resources in the second cloud computing environment further comprises:
    identifying additional application resources based on available application resources in the second cloud computing environment; and
    supplying information regarding the identified additional application resources.

12. The system of claim 11, wherein the additional application resources comprise at least one of messaging, security, language, network management, financial management, data processing, data management, web management, package version, or archival management.

13. A non-transitory computer-readable medium storing instructions that when executed by a processor, cause the processor to:

collect data representing application usage history from a current deployment and a previous deployment of a first cloud computing environment;

determine over a period of time a customized set of application resources in a second cloud computing environment to be used in view of temporary combinations of resources in the second cloud computing environment reported in the data representing application usage history;

receive a selection of one or more additional application resources to add to the customized set of application resources;

determine over the period of time, a cost per user of the customized set of application resources and the selected one or more additional application resources in the second cloud computing environment;

supply a recommendation regarding whether to migrate from the first cloud computing environment to the determined customized set of application resources and the selected one or more additional application resources in the second cloud computing environment in view of the cost per user being higher or lower than an amount over the period of time; and migrate one or more of the customized set of application resources or additional application resources in response to the recommendation.

14. The non-transitory computer-readable medium of claim 13, wherein the instructions causing the processor to determine a customized set of application resources in the second cloud computing environment further comprises the instructions causing the processor to:

determine a customized set of application resources for each of a plurality of cloud computing environments; and supply information regarding the determined customized set of application resources for each of the plurality of cloud computing environments.

15. The non-transitory computer-readable medium of claim 13, wherein the instructions further cause the processor to:

receive a set of application resource requirements comprising at least one of a list of applications, a list of types of applications, a list of application functionalities, a list of application appliances, a list of types of application appliances, or a list of application appliance functionalities.

* * * * *